April 10, 1928.
G. H. DAY
1,665,911
OPHTHALMIC MOUNTING
Filed March 18, 1927
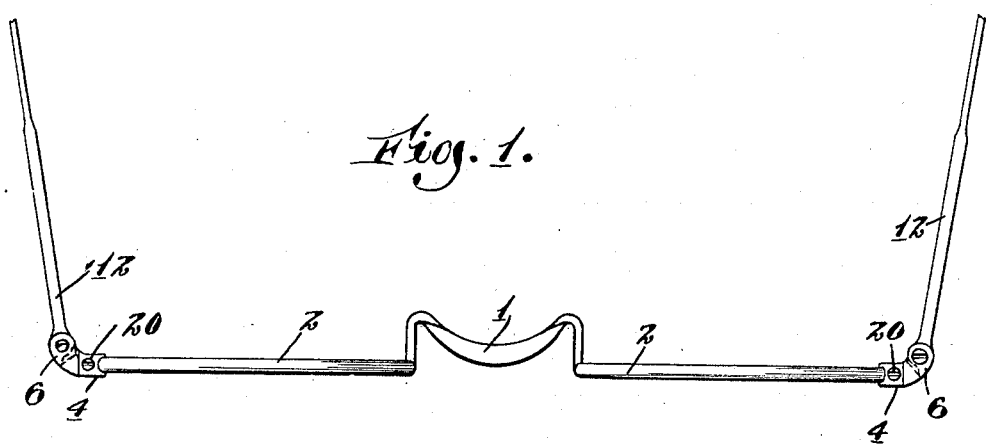
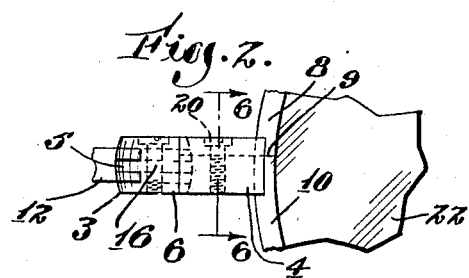
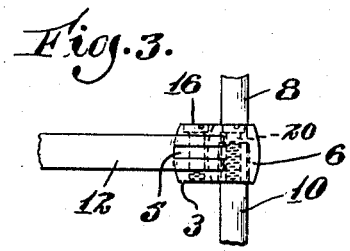
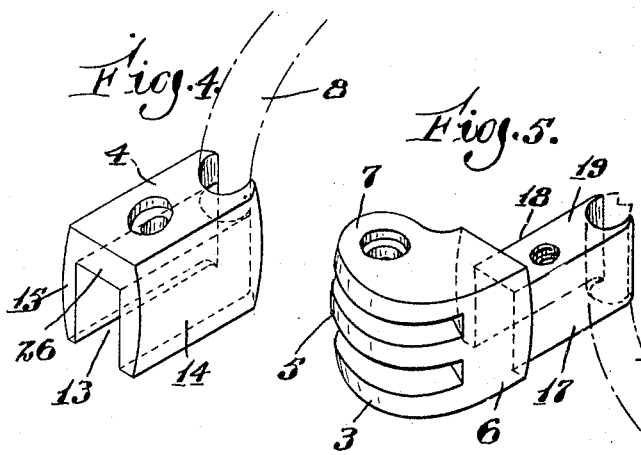
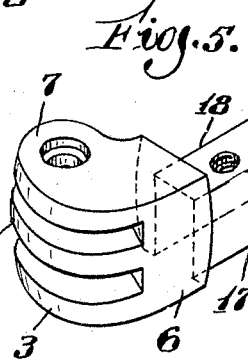
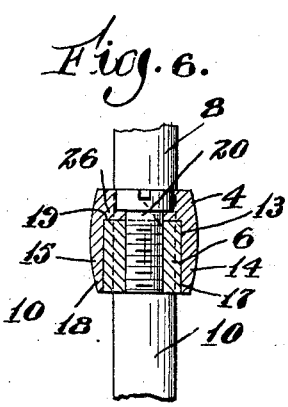
Inventor
George H. Day
by David Rines
Attorney Patented Apr. 10, 1928.

1,665,911

UNITED STATES PATENT OFFICE.

GEORGE H. DAY, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC MOUNTING.

Application filed March 18, 1927. Serial No. 176,492.

The present invention relates to ophthalmic mountings, and more particularly to split-rim spectacles in which provision is made for removing the temple without dislodging the lens and removing the lens without displacing the temple. From a more limited aspect, the invention relates to spectacles having double-ear temples, and to temple connections for the same.

Single-ear temples are mounted in place by simply pivoting the ear of the temple between two ears provided upon one or more end pieces,—one end piece in mountings of the rimless type and two separate end pieces in mountings having split, lens-holding rims. Temples having a plurality of ears are not so easily manipulated, particularly with mountings of the split-rim type. One of the advantages of a double-ear temple is the increased bearing surface provided by the additional temple ear; and it is not easy to design split-rim end pieces provided with sufficient bearing surface to cooperate efficiently with the bearing surfaces of the temple ears. Split-rim end pieces, furthermore, have a tendency to loosen, thereby weakening the tension upon the cooperating bearing surfaces of the temple and the endpiece ears.

It has heretofore been proposed to pivot the temple to one only of the split-rim end pieces, and to secure the other end piece to the temple-carrying end piece. In order for such proposals to be practicable, relative twisting of the end pieces must be avoided and the appearance of the mounting must be pleasing.

It is, therefore, among the objects of the present invention to improve upon ophthalmic mountings of the above-described character—whether of the single-ear or multiple-ear type,—to the ends that their construction shall be simplified, their attractiveness enhanced and their cost of manufacture lessened, and at the same time reducing to a minimum relative twisting of the end pieces.

With these and other objects in view, the nature of which will appear hereinafter, the invention consists of the improved ophthalmic mounting a preferred embodiment of which is hereinafter described, illustrated in the accompanying drawings, and defined in the appended claims.

In the accompanying drawings, Fig. 1 is a plan of a pair of spectacles constructed according to a preferred embodiment of the present invention; Fig. 2 is a fragmentary front elevation of the same upon a larger scale, partly in section; Fig. 3 is a similar fragmentary end elevation of the same; Figs. 4 and 5 are further enlarged perspective views of end pieces constructed according to a preferred embodiment of the present invention; and Fig. 6 is a section taken upon the line 6—6 of Fig. 2, looking in the direction of the arrows.

The invention is illustrated in connection with a pair of spectacles comprising a bridge 1 connecting lens-holding rims 2, each split at 9 and having end pieces 4 and 6 at the split ends 8 and 10 of the rim. The end piece 6 is longer than the end piece 4 and carries three perforated end-piece ears 3, 5 and 7. The perforation in the ear 3 is threaded and the perforation in the ear 7 is countersunk. The two perforated ears 11 of a temple 12 are inserted between adjacent end-piece ears 3, 5 and 7, the end-piece ears and the temple ears becoming thus alternately disposed. The temple is then pivotally secured in place upon the end piece 6 by a screw or other pintle 16 that extends through the perforations in the ears 3, 5, 7 and 11. The screw 16 is provided with an enlarged head that is seated in the countersunk perforation of the ear 7 and with a terminally threaded portion that is threaded in the threaded perforation in the ear 3. To remove the temple, or to remount it, all that is necessary is to manipulate the screws 16. During such pivotal movement, the bearing faces of the temple ears 11 bear frictionally against the bearing faces of the end-piece ears 3, 5 and 7. Reference may be had to a copending application, Serial No. 31,800, filed May 21, 1925, for a description of further details of construction, an understanding of which, however, is not necessary to an understanding of the present invention. In fact, the invention is, from certain aspects, equally applicable to single-ear temples and connections therefor.

According to the preferred embodiment of the present invention that is herein illustrated and described, the end piece 4 is provided with a U-shaped channel 13 extending outward away from the end 8 of the rim, The channel is of substantially rectangular cross section, and its side walls 14 and 15 are made as thin as possible in order that the width of the channel may be as near as possible to the width of the end piece 4 itself. The neck 26 of the U is preferably a little thicker than the thickness of the walls 14 and 15 in order to provide the necessary strength. A portion of the end piece 6 is also rectangular in cross section and is cut away slightly on three sides 17, 18 and 19 so as to correspond to the shape of the channel. The cut-away portion of the end piece is received snugly in the channel 13, with the cutaway sides in contact with the interior walls of the sides 14, 15 and 26. The end pieces 4 and 6 are secured together in any desired way, as by means of a screw 20 extending through the neck 26 of the U and threaded into a threaded opening in the side 19. The sides of the portion of the end piece 6 that extends beyond the channel, and to which the temple is pivoted by the screw 16, are then flush with the exterior walls of the sides 14, 15 and 26, so that the joint is hardly visible, and the two end pieces, when assembled, have the appearance of a single end piece.

The provision of the said channel 13 serves to guide the end piece 6 in the end piece 4 when the screw 20 is loosened to separate the end pieces 4 and 6 in order to insert or remove a lens 22. Relative twisting movement of the end pieces 4 and 6 and consequent chipping of the lens are thereby prevented during such opening movement, and when the work is completed, the screw 20 holds the lens in position within the rim. The strains introduced by the temple in its opening and closing movements, on the other hand, will be taken up entirely by the end piece 6, which is very rugged compared to the thin end piece 4, so that breakage of these thin walls is also prevented.

Modification within the spirit of the invention will obviously occur to persons skilled in the art, and all such are intended to be included within the scope of the appended claims.

What is claimed is:

1. An ophthalmic mounting having, in combination, a spit lens-holding rim having end pieces at the ends of the rim, one of the end pieces having a recess within which the other end piece is received, the said other end piece having a portion extending beyond the recess, and the extending portion having means for connecting a temple thereto.

2. An ophthalmic mounting having, in combination, a split lens-holding rim having end pieces at the ends of the rim, one of the end pieces having a channel extending outward away from the rim within which the other end piece is received, the said other end piece having a portion extending outward beyond the channel, and the extending portion having means for connecting a temple thereto.

3. An ophthalmic mounting having, in combination, a split lens-holding rim having end pieces at the ends of the rim, one of the end pieces having a U-shaped channel of substantially rectangular cross section extending outward away from the rim, the other end piece being of substantially rectangular cross section and being received in the channel, an element extending through the neck of the U and into the said other end piece to secure the end pieces together, the said other end piece, having a portion extending outward beyond the channel, and the extending portion having means for connecting a temple thereto.

4. An ophthalmic mounting having, in combination, a split lens-holding rim having end pieces at the ends of the rim, one of the end pieces having a U-shaped channel extending outward away from the rim, the other end piece being cut away on three sides to correspond to the shape of the channel and being received in the channel with the cut-away portions in contact with the interior walls of the channel, the said other end piece having a portion extending outward beyond the channel the sides of which are flush with the exterior walls of the channeled end piece, and the extending portion having means for connecting a temple thereto.

5. An ophthalmic mounting having, in combination, a split lens-holding rim having end pieces at the ends of the rim, one of the end pieces having a U-shaped channel of substantially rectangular cross section extending outward away from the rim, the other end piece having a portion cut away on three sides and the cut-away portion being of substantially rectangular cross section to correspond to the shape of the channel and being received in the channel with the three cut-away sides in contact with the interior walls of the channel, the said other end piece having a portion extending outward beyond the channel the sides of which are flush with the exterior walls of the channeled end piece, whereby the said other end piece may be guided in the channel during separation of the end pieces, and the extending portion of the said other end piece having means for connecting a temple thereto.

6. An ophthalmic mounting having, in combination, a split lens-holding rim having end pieces at the ends of the rim, one of the end pieces having a U-shaped channel extending outward away from the rim of substantially rectangular cross section and of width very nearly equal to the width of the said one end piece, whereby the walls of the channeled end piece are comparatively thin, the other end piece having a portion cut away slightly on three sides, whereby the width and thickness of the said portion are very nearly equal to the width and thickness of the channeled end piece, the cut-away portion being of substantially rectangular cross section to correspond to the shape of the channel and being received in the channel with the three cut-away sides in contact with the interior walls of the channel, the said other end piece having a portion extending outward beyond the channel the sides of which are flush with the exterior walls of the channeled end piece, whereby the two end pieces have the appearance of a single end piece when assembled and the said other end piece may be guided in the channel during the separation of the end pieces, and the extending portion of the said other end piece having means for connecting a temple thereto, whereby the strains caused by the temple will not be communicated to the walls of the channeled end piece.

In testimony whereof, I have hereunto subscribed my name.

GEORGE H. DAY.